(12) United States Patent
Black

(10) Patent No.: US 11,167,531 B2
(45) Date of Patent: Nov. 9, 2021

(54) GLAZING WITH A LIGHT GUIDE LAMINATE STACK

(71) Applicant: Pittsburgh Glass Works, LLC, Pittsburgh, PA (US)

(72) Inventor: Lauren Black, Apollo, PA (US)

(73) Assignee: Pittsburgh Glass Works, LLC, Pittsburgh, PA (US)

( * ) Notice: Subject to any disclaimer, the term of this patent is extended or adjusted under 35 U.S.C. 154(b) by 0 days.

(21) Appl. No.: 17/005,996

(22) Filed: Aug. 28, 2020

(65) Prior Publication Data

US 2021/0061163 A1    Mar. 4, 2021

Related U.S. Application Data

(60) Provisional application No. 62/894,037, filed on Aug. 30, 2019.

(51) Int. Cl.
*B32B 17/10*      (2006.01)
*B60Q 1/00*       (2006.01)
(Continued)

(52) U.S. Cl.
CPC .......... *B32B 17/10541* (2013.01); *B32B 3/02* (2013.01); *B32B 3/08* (2013.01); *B32B 7/023* (2019.01); *B32B 7/12* (2013.01); *B32B 17/10036* (2013.01); *B32B 17/1055* (2013.01); *B32B 17/1077* (2013.01); *B32B 17/10761* (2013.01); *B32B 17/10779* (2013.01); *B32B 17/10798* (2013.01); *B60Q 1/0011* (2013.01); *B60Q 1/268* (2013.01); *F21S 43/239* (2018.01); *B32B 2250/03* (2013.01); (Continued)

(58) Field of Classification Search
CPC ........ B32B 17/10005; B32B 17/10541; B32B 17/10798; B32B 17/1077; B32B 17/10779; B32B 17/10761; B32B 2329/06; B32B 2369/00; B32B 2367/00; B32B 2383/00
See application file for complete search history.

(56) References Cited

U.S. PATENT DOCUMENTS

| | | |
|---|---|---|
| 6,312,787 B1 | 11/2001 | Chiba et al. |
| 8,011,818 B2 * | 9/2011 | Negley ............... F21K 9/61 362/613 |

(Continued)

*Primary Examiner* — Evan P Dzierzynski
*Assistant Examiner* — Keith G. Delahoussaye
(74) *Attorney, Agent, or Firm* — Dentons Cohen & Grigsby P.C.

(57) ABSTRACT

A vehicle glazing (10) wherein a light guide stack (22) is located between a portion of the inner transparency (26) and the outer transparency (28). The light guide stack includes a polycarbonate film (32) that is bonded to the transparencies by layers of PET (38, 40) that are secured to the polycarbonate film on one side by silicone (34, 36) and that are secured to the transparencies on the other side by PVB (42, 44). The terminal end of an extending tab of the polycarbonate film forms an edge that is connected to a light bar (14) that such visible light propagates through the light bar and into the polycarbonate film through the edge. Visible light propagates through etchings in the smooth surface of the polycarbonate film to form an image. An extension of one of the transparencies protects the polycarbonate tab and supports the light bar during installation of the glazing into the vehicle portal.

57 Claims, 6 Drawing Sheets

(51) Int. Cl.
  *B60Q 1/26*     (2006.01)
  *F21S 43/239*   (2018.01)
  *B32B 7/023*    (2019.01)
  *B32B 3/02*     (2006.01)
  *B32B 7/12*     (2006.01)
  *B32B 3/08*     (2006.01)
  *F21Y 115/10*   (2016.01)

(52) U.S. Cl.
  CPC ....... *B32B 2250/40* (2013.01); *B32B 2270/00* (2013.01); *B32B 2307/412* (2013.01); *B32B 2307/546* (2013.01); *B32B 2307/558* (2013.01); *B32B 2307/5825* (2013.01); *B32B 2307/732* (2013.01); *B32B 2329/06* (2013.01); *B32B 2367/00* (2013.01); *B32B 2369/00* (2013.01); *B32B 2383/00* (2013.01); *B32B 2605/006* (2013.01); *F21Y 2115/10* (2016.08)

(56) References Cited

U.S. PATENT DOCUMENTS

| | | |
|---|---|---|
| 8,016,467 B2 | 9/2011 | Eberwein |
| 9,568,659 B2 | 2/2017 | Solarski et al. |
| 9,599,766 B2 | 3/2017 | Hoyle et al. |
| 10,025,027 B2 * | 7/2018 | Odulinski ............ G02B 6/0043 |
| 2007/0098969 A1 * | 5/2007 | Ansems ............ B32B 17/10339 |
| | | 428/212 |
| 2008/0285274 A1 * | 11/2008 | Jung ................ G09F 13/18 |
| | | 362/240 |
| 2012/0307337 A1 * | 12/2012 | Bartug ............ B32B 17/10229 |
| | | 359/245 |

* cited by examiner

GLAZING WITH A LIGHT GUIDE LAMINATE STACK

RELATED APPLICATIONS

This application claims priority to U.S. Provisional Patent Application No. 62/894,037 filed Aug. 30, 2019, which is incorporated herein in its entirety.

BACKGROUND OF THE PRESENTLY PREFERRED INVENTION

Field of the Invention

The presently disclosed invention relates to glazings that are suitable for use in vehicle windows and methods for making such glazings.

Discussion of the Prior Art

Vehicle development is trending to electric and even autonomous vehicles. In addition, there also is a need for communications from the vehicle to persons outside the vehicle such as pedestrians and other vehicle operators. For these and other reasons, there has been growing interest in vehicle glazings that cooperate with various sensors to communicate with vehicle operators and others by means of designs and alpha-numeric codes that are displayed in the glazing. Such combinations also support "heads-up" displays that are sometimes deemed to be safer and more reliable than alternative information systems and methods.

In this regard, attention has been directed to systems that incorporate LED front lighting technology. LEDs are favored in light guide designs that are intended for high-performance because they have relatively high in-coupling efficiency. In those systems, a preferred material for directing light into the light guide has a high refractive index and a high reflectance. Inside the light guide, the light is repeatedly reflected back and forth from the surfaces as it proceeds through the light guide in the direction of the net internal reflection to the end of the light guide. In particular, LED front lighting has been found to afford lower power demands than conventional backlighting techniques. In LED front-lighting systems, a light-guide displays a fixed image in response to illumination from a light emitting diode in the "on" state. The image is not visible at times when the LED is in the "off" state.

A "light guide" is an optically transparent material that is capable of conducting and distributing visible light. Light guide materials employ a principle of reflection caused by different refractive indices of two materials. Light guides are used to distribute a light source homogenously over a given area. Examples of such light guide applications include LCD backlighting, information displays, mood lighting, and design light effects.

In front lighting, all the power is used to create the light image (as opposed to creating a silhouette of an illuminated panel). For example, FLEx Lighting supplies an LED front lighting product that incorporates an ultra-thin, flexible light guide in the form of a film or sheet. A light-guide film that is thinner than a piece of paper is illuminated through the edge of the film from a light stick or bar. Typically, LEDs are too large to merely butt up to the edge of the film. Instead, a light bar is attached to the edge of the thin film and an LED is focused on the end of the light bar to propagate visible light into the film.

The ultra-thin light guide film can conform to many contours such that it is compatible with many glazing shapes. The ultra-thin light guide film radiates visible light from the film surface according to surface etchings. Thus, the film can transmit a message according to designs and alpha-numeric sequences that are etched into the face surface of the light guide film. By way of example, such messages could be conventional road signs and/or written instructions.

A typical thin-film light guide may have a thickness in the range of about 25 to 75 microns. A light-bar is used to propagate light in the range of visible wavelengths into an edge of the film. Light that is transmitted into the light-guide film is generally confined between the smooth face surfaces of the film except in those areas where the smooth face surface is disturbed by etching or other surface discontinuities. It has been found that this arrangement demands relatively low power and affords comparatively high uniformity, good contrast, good color range and full viewing angles.

In accordance with the presently disclosed invention, the ultra-thin light guide is a film of polycarbonate material ("PC") that serves as the light-guide and light transporting film. Vehicle glazings typically employ polyvinyl butyral (PVB) as interlayers. PC does not adhere to PVB, but PC will adhere to ethylene-vinyl acetate (EVA) and also to polyurethane (PU) so that EVA of PU layers can be used in a light guide stack on opposite faces of the PC film to adhere the light guide to an adjacent transparency.

In addition, polyethylene terephthalate (PET) does adhere to PVB and urethane and silicone can be used with PC as bonding agents. Accordingly, a PC layer or film in a light-guide stack may include transparent layers of PET that oppose opposite faces of the PC film. A PVB layer is added to one side of the PET layer to adhere to an adjacent transparency. Because PET does not laminate to PC, the PET layers are bonded to the PC layer with an adhesive such as silicon. However, to make such light-guide stacks suitable for use in a vehicle glazing, it has been found that further modifications are needed.

SUMMARY OF THE DISCLOSED INVENTION

In accordance with the presently disclosed invention, a glazing that projects light in the form of an image includes a glazing laminate that has at least one transparency and a light guide laminate stack that includes a PC film. The surface of the PC film is etched according to designs or symbols in the form designed to communicate a message. When visible light is propagated through a side edge of the film, light is emitted from the etched portions of the surfaces according to the shape of the etched designs and symbols.

In some cases, a light source is added to the glazing before it is delivered to the location of vehicle assembly. In other cases, the light source is added at the time the glazing is mounted in the vehicle portal for the glazing.

The glazing laminate may include a film that has cladding layers of polyethylene terephthalate (PET) on one or both sides of the PC film. The PET layers may be secured to the PC with a bonding agent such as silicone.

In vehicle glazings that include more than one transparency sheet, the transparency sheets are typically separated by an interlayer such as PVB or other suitable material. To match the thickness of the light guide laminate stack to the thickness of those portions of the glazing that include an interlayer, the light guide laminate stack may sometimes include one or more spacing layers. In a preferred embodiment, spacing layers may be comprised of EVA, PU, PVB and combinations thereof.

To aid in the lamination process, a partial vacuum is applied to the light guide laminate stack to remove air that is trapped between the layers of the stack. In some cases, the glazing may include a transparency sheet that has a perimeter side edge that defines the outer perimeter of the transparency sheet in combination with a light guide laminate stack having a PC film that terminates in a film edge. The film edge is located inside the perimeter of the transparency sheet such that it may be connected to a light source that is connectable to the transparency sheet. In this way, the transparency extends beyond the PC film and guards against inadvertent bending, crushing or other impacts to the PC film. This protection is especially important during the time when the light guide glazing is installed in the vehicle portal. At that point, the glazing assembly has been heat-treated to bond the laminate layers of the glazing process. The heat-treatment process tends to embrittle the polycarbonate tab and make it more susceptible to damage from impacts with the vehicle body. Glazings wherein the film edge is located inside the perimeter of the transparency sheet can be deaired with a vacuum bag. In some cases of glazings constructed in this way, the light source can be added before heat treating the light guide glazing so that the assembly arrives at the assembly location without need for connecting the light source to the glazing laminate during the vehicle assembly process.

In other cases, the glazing may include a transparency sheet that has a perimeter side edge that defines the outer perimeter of the transparency sheet in combination with a light guide laminate stack having a PC film that terminates in a film edge that is located outside the perimeter of the transparency sheet. In this way, the polycarbonate film of the light guide stack extends to form a light guide tab. The glazing may be deaired before a light source is attached to the PC film by using a vacuum collar that surrounds the transparency sheet and the light guide stack adjacent its perimeter edge. Glazings constructed in this way can be manufactured faster because deairing with a vacuum collar is faster than deairing with a vacuum bag.

Preferably, the disclosed glazing includes a first transparency, a second transparency, and a light guide laminate stack that is disposed between portions of the first transparency and the second transparency. The light guide laminate stack includes a polycarbonate film that defines oppositely disposed major surfaces. Portions of the oppositely disposed major surfaces define a smooth, continuous surface, but at least one portion of at least one of the major surfaces defines interruptions in the smooth continuous surface of the major surfaces. Light in the visible light spectrum propagates through the polycarbonate film between the smooth, continuous portions of the major surfaces of the polycarbonate film, but the light passes out of the polycarbonate film through the interruptions in the smooth, continuous surface. An interlayer is located between portions of said first transparency and said second transparency where there is no light guide laminate stack. The interlayer has a nominal thickness that is approximately the same nominal thickness as the light guide stack to limit bubbles and distortions in the area of the glazing where the light guide stack butts against the interlayer from occurring during manufacture of the glazing. A light bar is connected to an edge of the polycarbonate film so that light in the visible spectrum propagates from the light bar, through the edge of the polycarbonate film, and into the polycarbonate film.

Other objects and advantages of the presently disclosed invention will become apparent to those skilled in the art as a detailed description of several presently preferred embodiments proceeds.

BRIEF DESCRIPTION OF THE DRAWINGS

Several presently preferred embodiments of the presently disclosed invention are shown and described herein in connection with the accompanying drawings wherein.

DESCRIPTION OF PRESENTLY PREFERRED EMBODIMENTS OF THE DISCLOSED INVENTION

In the presently disclosed invention, a glazing laminate that includes at least one transparency sheet is combined with a light guide laminate stack is useful for application in vehicles. In many vehicles, side lights include only a single transparency sheet while the forward facing glazings such as windshields include two or more transparencies that are separated by an interlayer. Although a presently preferred embodiment is described in connection with a windshield, the disclosed invention is also applicable to glazings that typically employ a single transparency sheet in accordance with the claimed invention.

Figure 1:
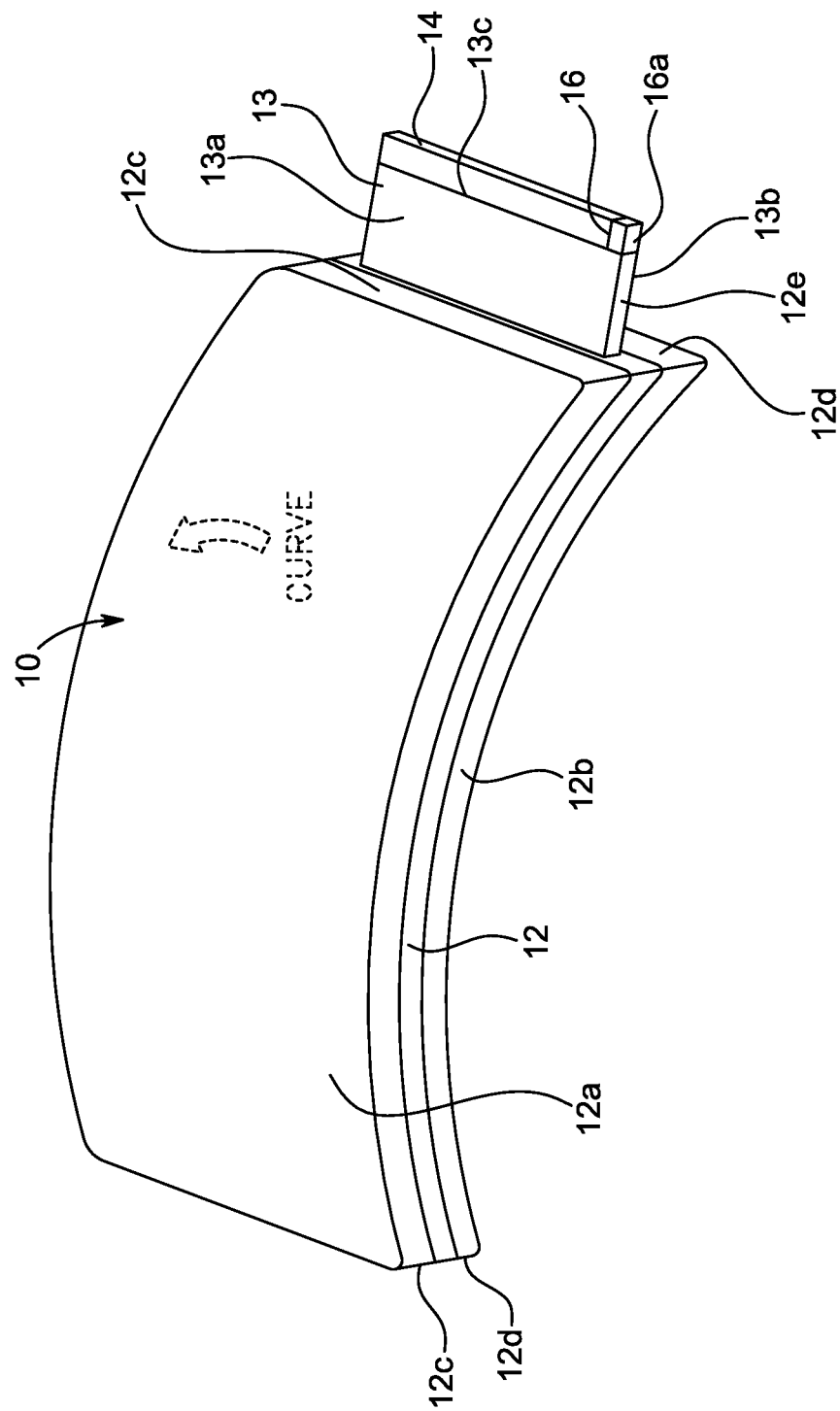
FIG. 1 is a perspective view of a light guide glazing in accordance with the presently disclosed invention.

In accordance with the presently preferred embodiment illustrated in FIG. 1, a vehicle glazing 10 for use as a windshield wherein a light-guide stack is applied across within the daylight opening ("DLO") of the windshield. For reasons that are hereafter explained in detail, glazing 10 incorporates a light guide stack 12 that includes a PC film. Glazing 10 includes a first transparency sheet 12a and a second transparency sheet 12b that are arranged on opposite sides of light guide stack 12. Transparency sheet 12a defines a perimeter side edge 12c that defines the perimeter of transparency sheet 12a and transparency sheet 12b defines a perimeter side edge 12d that defines the perimeter of transparency sheet 12b. Light guide stack 12 also defines a tab 13 wherein PC film 12e of light guide stack 12 extends outside the perimeter of transparency sheet 12a and extends outside the perimeter of transparency sheet 12b. Throughout light guide stack 12, PC film 12e defines a surface 13a that faces transparency sheet 12a and a surface 13b that faces transparency sheet 12b. Surface 13a is oppositely disposed on PC film 12e from surface 13b and a film edge 13c is located between surface 13a and surface 13b. Portions of film surface 13a and portions of surface 13b each define a smooth, continuous surface. Light in the visible light spectrum that illuminates film edge 13c propagates through PC film 12e between the smooth, continuous portions of the film surface 13a and film surface 13b.

At times when glazing 10 is installed in a vehicle, a light source such as a light-bar 14 may illuminate film edge 13c to cause light to propagate through PC film 12e. In some cases, the light source such as light guide 14 may be adhered to a portion of film edge 13c on PC tab 13. In other cases, the light source such as light guide 14 may be adhered to a portion of the film edge 13c that is located at the perimeter defined by the perimeter side edge 12c of transparency sheet 12a or at the perimeter defined by the perimeter side edge 12d of transparency sheet 12b or at the perimeters of both transparency sheets 12a and 12b.

When an end 16 of light-bar 14 is irradiated with visible light such as, for example, from an LED 16a, the light from the LED propagates through light-bar 14 and through the adjoining film edge 13c of PC film 12e. Inside PC film 12e, light propagates between the smooth face surfaces 13a and 13b of PC film 12e. Portions of surface 13a or 13b of PC film 12c may define a pattern of irregularities so that the surface is discontinuous. Such patterns can be made by etching or similar process to create a pattern in the shape of alpha-numeric characters, designs, or other images. Light traveling through PC film 12e between surfaces 13a and 13b passes out of PC film 12e through the irregularities or discontinuities formed by the etchings so that the light forms a visible pattern according to the pattern of the discontinuities in surface 13a or 13b. In this way, surfaces 13a or 13b may be scored or etched with designs or alpha-numeric sequences to form readable messages or instructive images. In the example of FIG. 1, the design illustrates a visible message that warns of a road curve.

Figure 2:
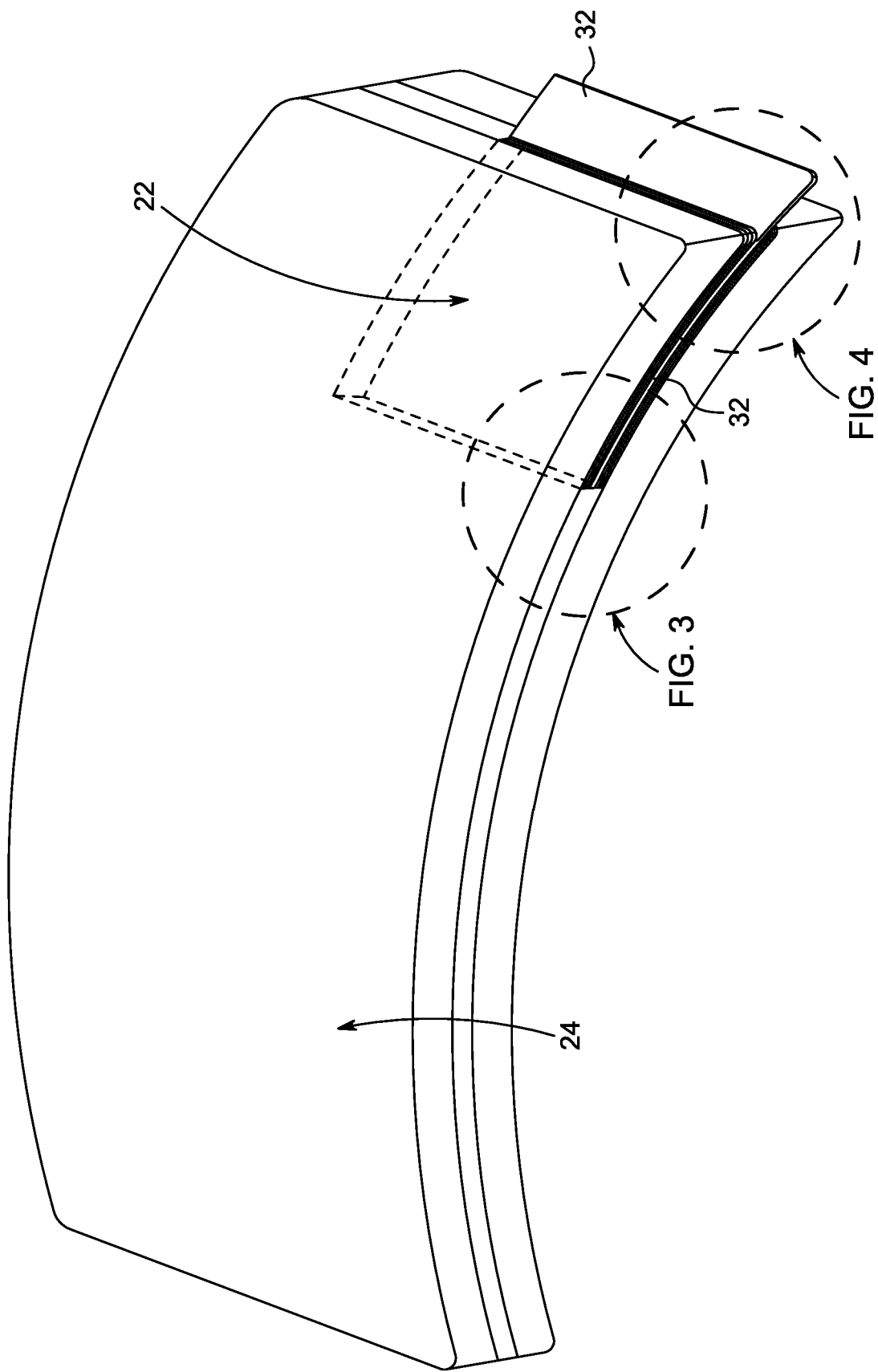
FIG. 2 is a perspective view of the light guide glazing of FIG. 1 that shows further detail of the light guide, including an extended light guide tab that is available for connection to a light source such as a light bar.

Further details of a vehicle glazing according to the disclosed invention are shown in FIG. 2. FIG. 2 illustrates a light-guide stack 22 that extends over only a portion of the daylight opening (DLO) of a vehicle glazing 24. Details of the glazing transparencies, the interlayer that separates the transparencies, and light-guide stack 22 are shown and described in connection with FIGS. 3 and 4.

Figure 3:
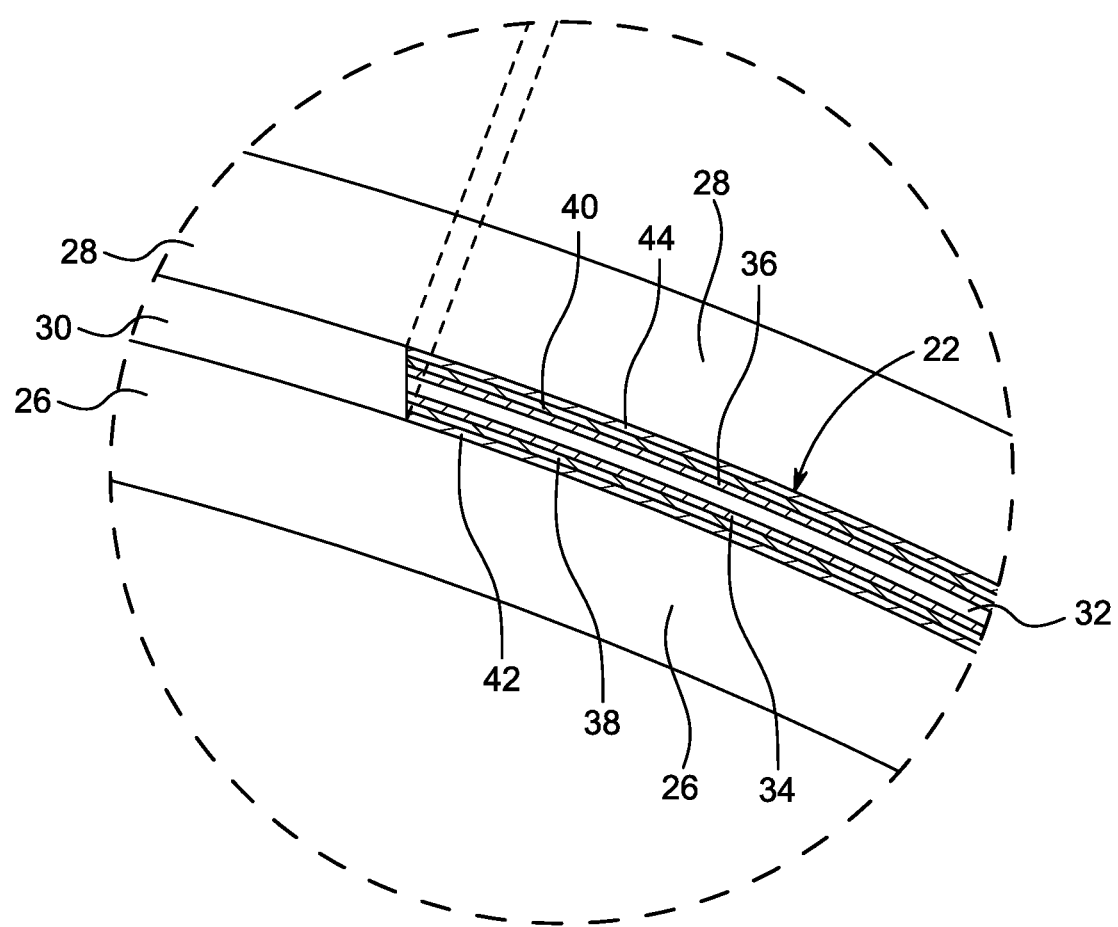
FIG. 3 is an enlarged portion of the light guide glazing shown in FIG. 2 showing further detail of the glazing in FIG. 2.

FIG. 3 shows light-guide stack 22 and the rest of the glazing laminate 24. In glazing 24 an inner transparency 26 and an outer transparency 28 are separated by an interlayer of PVB 30. During the lamination process, the transparency layers 26 and 28 are bonded to PVB layer 30 such that if the transparencies 26 or 28 should fracture, they are sufficiently bonded to PVB layer 30 that shards of transparencies 26 or 28 generally remain attached to PVB layer 30.

To limit weight, reduce material cost, and other factors, the overall thickness of glazing 24 is made as low as possible. However, it has been found that the practical effect of certain performance requirements for the glazing such as opposition to wind loading, impact resistance, chip resistance, shatter resistance, and other factors impose a minimum thickness for vehicle glazings. The minimum thickness of a vehicle glazing varies depending on the purpose and orientation of the glazing in the vehicle, but commercial factors have established generally minimum thicknesses for conventional transparency layers and conventional laminate layers. For PVB used in windshields, the nominal thickness of the conventional PVB layer is 0.76 mm. In some cases, a thinner layer of PVB that is 0.38 mm may be used in vehicle windshields.

It has been found that for glazings such as shown in FIGS. 2 and 3 where the light-guide stack 22 interfaces with an end of PVB interlayer 30, the overall thickness of the light-guide stack must closely approximate the overall thickness of PVB layer 30. The overall thickness of light-guide stack 22 must closely approximate the overall thickness of PVB interlayer 30 to avoid visible distortions, bubbles and other unwanted effects that may occur during the lamination process. Accordingly, a motor vehicle glazing that is intended for use as a windshield wherein the nominal thickness of the PVB interlayer is a standard 0.76 mm, the thickness of the light-guide stack also must be approximately 0.76 mm. to avoid visible distortion of the glazing following lamination.

In an example of the embodiment of FIG. 3, light-guide stack 22 includes a PC film 32 with cladding layers of PET 38 and 40 that are bonded to opposing faces of PC film 32 by respective layers of silicone 34 and 36. In other examples, cladding layers other than PET bonded by silicone could also be used. The thicknesses of the PC film 32, cladding layers 38 and 40 and silicone layers 34 and 36 are substantially less than the thickness of PVB interlayer 30 of 0.76 mm (30 mil). For example, the PC film thickness is approximately 0.127 mm (5 mil), the PET cladding layer thicknesses are approximately 0.076 mm (3 mil) (each), and the thickness of the silicone layers is approximately 0.041 mm (1.6 mil) (each). To make the thickness of light guide laminate stack approximate the thickness of PVB interlayer 30, two spacing layers 42 and 44 are included. Spacing layers 42 and 44 are capable of binding the PET layers 38 and 40 to respective transparencies 26 and 28. In the example of FIG. 3, spacing layers 42 and 44 are made of PVB. Other compositions such as EVA and PU also could be used for spacing layers 42 and 44. In some cases, the light guide stack may be composed of a layer of PC film 32 and layers of EVA or PU that bond to PC film 32 and transparencies 38 and 40 and avoid need for layers of PET, PVB, or other layers. PVB, PU and EVA are commercially available in a thickness of about 0.38 mm (15 mil). By selecting spacing layers 42 and 44 with a nominal thickness of 0.38 mm (15 mil), the overall thickness of the light guide laminate stack sufficiently approximates the overall thickness of PVB interlayer 30 to avoid the difference in thickness from being a source of visible distortions, bubbles and other unwanted effects during the lamination process.

In accordance with the disclosed invention, light-guide stack 22 forms an interlayer between inner transparency 26 and outer transparency 28. In the presently disclosed invention, the transparencies 26 and 28 may be glass. Because PET does not bond to glass, the PET layers in the light-guide stack 22 are covered with respective PVB layers 42 and 44. The thickness of the overall stack 22 includes both of the PVB layers 42 and 44 that cover the PET layers 38 and 40. The light-guide stack 22 must approximately equal the nominal thickness of PVB layer 30. In the illustration of FIG. 3, the thickness of PC film 32, silicone layers 34 and 36, PET layers 38 and 40 and PVB layers 42 and 44 must approximately equal 0.76 mm, the thickness of PVB interlayer 30.

It has been found that while attaining the overall thickness of light-guide stack 22 to match the thicknesses of PVB layer 30, the selection of the respective thickness of PC film 32, silicone layers 34 and 36, PET layers 38 and 40 and PVB layers 42 and 44 is not merely a matter of selecting or modifying commercially available products through routine experimentation to achieve the necessary total thickness. Other factors and limitations that result in variables that are not apparent to one normally skilled in the art also must be accommodated. In fact, the identification and selection of the preferred thickness for the respective layers in light-guide stack 22 occurs in a manner that is counter-intuitive and contrary to previously known choices and methods.

For example, PVB layers 42 and 44 must have a minimum thickness that will support adequate lamination with respective glass layers 26 and 28. This is necessary to enable portions of glazing 24 that incorporate light-guide stack 22 to comply with various performance requirements for windshield impacts such as avoidance of free glass shards upon fracture and other factors. Also, it has been found that PET layers 38 and 40 in light-guide stack 22 must have a thickness of at least 0.0762 mm (3 mil). This is necessary to avoid certain undesirable consequences to the PET layers during lamination—namely, flowing, wrinkling and orange pealing action of PET layers 38 and 40 during the autoclave step of lamination. The use of PET layers that are typical of normal PET layers (typically about 0.0508 mm) was surprising and unexpected because, in the prior art, it was determined that PET layers exhibiting such effects should be made thinner than 3 mil—not thicker as according to the presently disclosed invention. As another example, it has been found that the PC film thickness must be 2 mil to avoid wrinkling of the PC film during the autoclave step of lamination. Preferably, the thickness of the PC film is as much as 5 mil and, more preferably, in the range of 3 to 4 mil.

Figure 4:
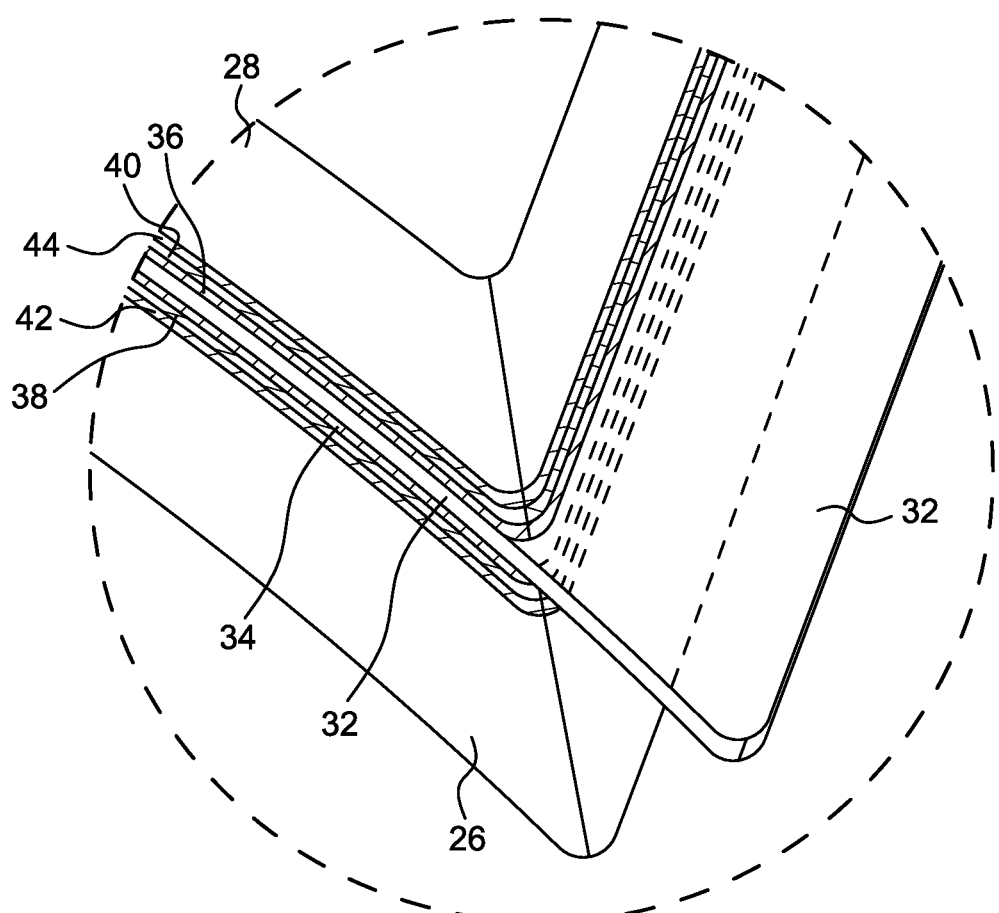
FIG. 4 is another enlarged portion of the light guide glazing shown in FIG. 2 showing further detail of the glazing, including an extension of the PC film.

FIG. 4 illustrates that according to the presently disclosed invention it has been found preferable to remove PET layers 38 and 40 and silicone layers 34 and 36 from the portion of PC film 32 that extends as tab 13 beyond the perimeter of the transparencies 26 and 28. In addition, it has been found preferable that the PC film 32 is made thinner than the usual thin-film light guide. Preferably, the thickness of PC film 32 is in the range of 0.0508 mm (2 mil) to 0.127 mm (5 mil). The reason for the removal of the PET and silicone layers from the extended tab portion of PC layer 32 and for the limitation on thickness of PC film 32 is for purposes of an improved method of manufacture. These modifications and limitations on the PC film afford the PC film enhanced flexibility that accommodates the commercial process for forming vehicle glazings.

In the commercial manufacture of vehicle glazings, the glazing stack is subjected to a vacuum process prior to the autoclave step of lamination. The purpose of the vacuum process is to remove air that is trapped between the various layers of the glazing prior to the autoclave step of lamination. If excess air remains between the layers, the glazing may tend to exhibit visual defects such as bubbles. Other unwanted consequences such as delamination may also occur.

To remove the excess air, a vacuum ring is placed around the perimeter of the glazing 24 before lamination. The vacuum ring closely abuts the edge of the glazing 24 so that vacuum conditions inside the ring are communicated to the interior of the glazing. In this way, air is drawn from between the layers of the glazing and into the vacuum ring until sufficient vacuum levels inside the glazing stack are established.

For the vacuum ring to effectively communicate vacuum conditions to the interior of the glazing stack, the ports on the vacuum ring must be close to the edge of the glazing stack. This means that the clearance tolerance between the perimeter edge of the glazing stack and the inwardly facing side of the vacuum ring must be small. As previously explained in connection with FIG. 1, a tab portion 13 of PC film 12e extends beyond the perimeter edge 12c and 12d of transparency sheets 12a and 12b of the glazing so that light bar 14 transmits light into PC film 12e through an exposed edge 13a of PC film 12e. However, since tab 13 of PC layer 12 extends beyond the perimeter of transparency sheets 12a and 12b, the vacuum ring will interfere with tab 13 as the vacuum ring is positioned around the perimeter edge of the glazing stack.

Previously, it was thought that PC film 12e must have sufficient mechanical strength to tolerate contact with the vacuum ring. This led to designs wherein the PET cladding layers 38 and 40 on the PC film 32 throughout tab 32 were maintained and PC film 32 even made thicker to give PC film 32 added mechanical strength to tolerate contact with the vacuum ring. However, surprisingly, the disclosed invention yields the opposite result.

First, according to the disclosed invention, PET layers 38 and 40 and silicone layers 34 and 36 are completely removed from the tab portion of PC film 32. Secondly, PC film 32 is thinner than the thicknesses previously known. In the presently disclosed invention, PC film 32 survives interference with the vacuum ring by reason of its flexibility—not mechanical strength. In the presently disclosed invention, PC film 32 is sufficiently flexible to bend out of the path of the vacuum ring without damage to the PC film while the vacuum ring still draws sufficient vacuum at the interior of the glazing. This is contrary to a requirement of added mechanical strength produced by a relatively thicker PC film.

The embodiment shown and described in connection with FIGS. 2-4 may further incorporate a light source such as a light guide that is secured to the tab portion of PC film 32. The light source may be added prior to delivery of the glazing to the place of vehicle assembly or the light source may be added to the glazing as part of the larger process of vehicle assembly.

Figure 5:
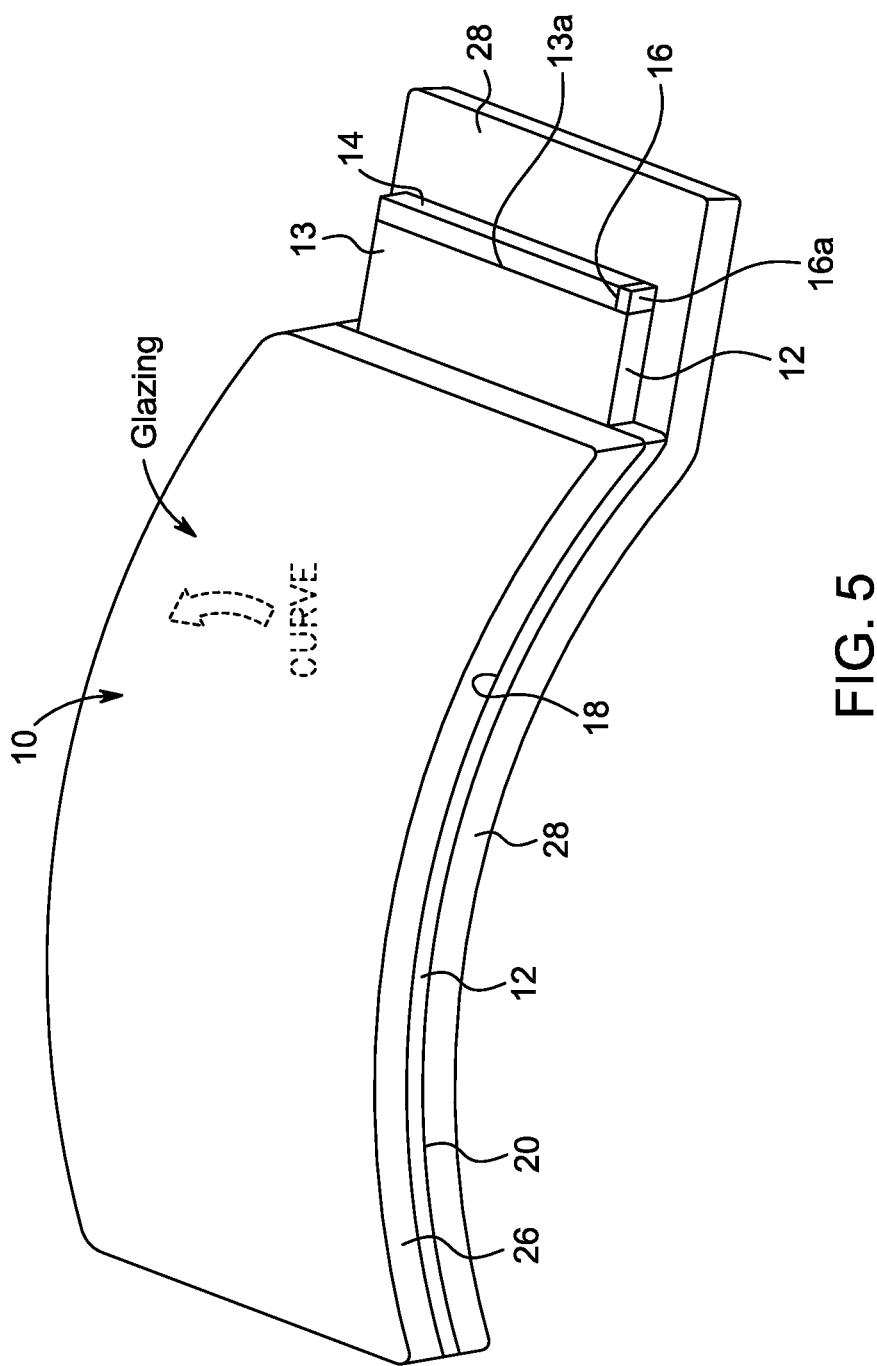
FIG. 5 is an alternative embodiment of the disclosed light guide glazing wherein a protective glass layer extends from the main body of the glazing.

FIG. 5 shows an alternative embodiment of the presently disclosed invention. In the embodiment of FIG. 5, PC film 12e includes PC film tab 13 that terminates at edge 13a. Light bar 14 is connected to edge 13a of PC film 12e as described in connection with FIG. 1. As also described in connection with FIG. 1, when end 16 of light bar 14 is illuminated, light propagates from light bar 14 through edge 13a and into PC film 12. However, in the embodiment of FIG. 5, glass sheet 28 extends beyond edge 13a of tab 13 and beyond at least a portion of light bar 14. In this way, light bar 14 may be secured to glass sheet 28 by a bonding agent or other suitable fastening method so that glass sheet 28 mechanically supports light guide 14 and affords greater stability for light guide 14 and PC film tab 13 that is outside the perimeter of perimeter sides of transparency 26.

The structure illustrated in FIG. 5 provides greater durability during manufacturing and handling of glazing 10 as well as at the time that glazing 10 is installed in the vehicle. It has been found that this structure tends to protect PC film 12 from breaking or tearing during handling or in the process of attaching the light guide after autoclaving. The extended portion of glass sheet 28 can also assist as a guide in positioning glazing 10 during installation in the vehicle and for maintaining stability of tab 13 and light guide 14 as the glazing is installed.

For the embodiment of FIG. 5, a vacuum channel is not generally suitable for deairing the glazing laminate stack because the clearance tolerance of the vacuum channel does not accommodate the difference in the perimeters of transparencies 26 and 28. For example, a vacuum channel that passes close to the edge of transparency 26 would interfere with the extended portion of transparency 28. Accordingly, for the embodiment of FIG. 5, a vacuum bag or equivalent device may be used to deair the glazing prior to heating in an autoclave or other curing process.

It has been found that the extended portion of glass sheet 28 may afford protection for PVB, polyurethane, or other interlayer materials, especially after such materials have been somewhat embrittled by an autoclave or other heating or curing process. For example, when the glazing is installed in the vehicle opening there is a risk that the extended tab will be damaged by contact with the vehicle body.

Figure 6:
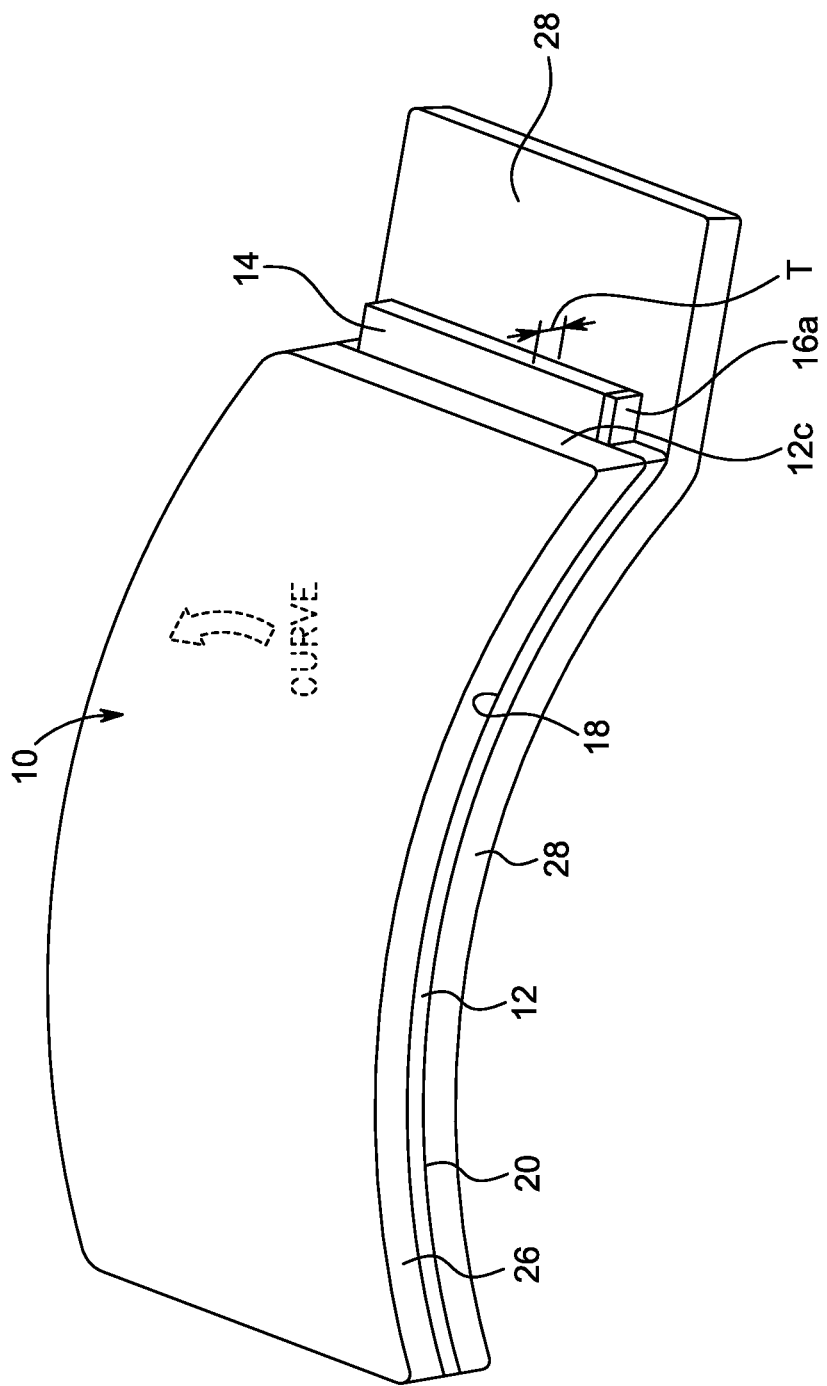
FIG. 6 is another alternative embodiment of the disclosed light guide glazing wherein a protective glass layer extends from the main body of the glazing and wherein the light guide body contacts the edge of another glass layer.

FIG. 6 further shows that light bar 14 is in contact with the perimeter side edge 12c of transparency 26. When light bar 14 is positioned in contact with the perimeter side edge in this way prior to autoclaving, the body of light guide 14 forms a seal with the perimeter side edge of transparency 26 during the autoclave step of lamination. This seal aids in maintaining lamination of the light guide stack and avoiding bubbles in the laminate, especially near the perimeter boundary of transparency 26. To aid in formation of such a seal, the presently disclosed invention employs a light guide having a body made of Delrin™ or similar plastic material.

The embodiment of FIG. 6 also illustrates that it is preferred that the thickness of the light guide is no greater than 3.0 mm. (measured in a direction orthogonal to the surface of inner transparency 28). More preferably, the thickness ("T") of light guide 14 is 2.6 mm or less. The thickness of light guides such as used in connection with the embodiment of FIGS. 1-4 is typically 5 mm. However, the lower profile (thickness) of the light guide preferred for the embodiment of FIG. 6 allows the light bar to butt against the perimeter edge of inner transparency 26 with a maximum elevation of the assembled glazing (including the light bar) not higher than the outer surface of outer transparency 26. In this way, the assembled glazing is compatible with standard size and shape openings for receiving glazings in many vehicles.

Other features, objects and advantages of the presently disclosed invention are set forth below with the scope of the following claims.

What is claimed is:

1. A glazing that projects light in a predetermined pattern in response to an illumination signal, said glazing comprising:
    a glazing laminate that includes at least one transparency sheet that defines a perimeter side edge;
    a light guide laminate stack that defines a first surface that faces at least a portion of said at least one transparency sheet, said light guide laminate stack including
        a polycarbonate film that defines a first film surface, a second film surface that is oppositely disposed on said film from said first film surface, and a film edge between said first film surface and said second film surface, portions of said first film surface and portions of said second film surface each defining a smooth, continuous surface such that light in the visible light spectrum propagates through said film between said smooth, continuous portions of said first film surface and said second film surface, said first film surface also defining a pattern of irregularities in said smooth continuous surface such that light propagating through said film between said first film surface and said second film surface passes out of said first film surface through said pattern of irregularities in said first film surface,
    a second transparency sheet having a perimeter edge, said second transparency sheet defining a surface that faces said at least one transparency sheet with the film edge of said film extending past the perimeter edge of said second transparency sheet to form an extension tab outside the perimeter of said transparency sheet with said film edge of said film defining the distal end of said extension tab;
    at least one layer of polyethylene terephthalate between said film and said second transparency sheet;
    a spacing layer between said layer of polyethylene terephthalate and said second transparency sheet, the material of said spacing layer being selected from the group comprising polyvinyl butyral, polyurethane, and ethylene vinyl acetate and combinations thereof; and
    an interlayer that is located between said second transparency sheet and said at least one transparency sheet, said interlayer defining a first surface that opposes a surface of said at least one transparency sheet, said interlayer also defining a second surface that opposed to the surface of said second transparency sheet that faces said at least one transparency sheet, the separation between the first surface of said interlayer and the second surface of said interlayer defining the thickness of said interlayer; and
    a light source that defines a body that contacts the perimeter edge of said second transparency sheet, said light source being connected to said film edge of said film of said light guide laminate stack such that light in the visible spectrum propagates from said light source through said film edge and into said film between said first film surface and said second film surface.

2. The glazing of claim 1 wherein said at least one transparency sheet is attached to a light source with said film edge being located inside the perimeter defined by the perimeter side edge of said at least one transparency sheet.

3. The glazing of claim 2 wherein the light source that is connected to said film edge of said film of said light guide laminate stack such that light in the visible spectrum propagates from said light source through said film edge and into said film between said first film surface and said second film surface.

4. The glazing of claim 3 wherein said light source includes a light emitting diode.

5. The glazing of claim 2 wherein said film of said light guide laminate stack comprises polycarbonate.

6. The glazing of claim 5 wherein said light guide laminate stack further includes at least one layer of polyethylene terephthalate between said film and said at least one transparency sheet.

7. The glazing of claim 5 wherein said light guide laminate stack further includes at least one spacing layer between said film and said at least one transparency sheet, the material of said spacing layer selected from the group comprising polyvinyl butyral, ethylene vinyl acetate, polyurethane, and combinations thereof.

8. The glazing of claim 6 wherein said light guide laminate stack further includes at least one spacing layer between said layer of polyethylene terephthalate and said at least one transparency sheet, the material of said spacing layer being selected from the group comprising ethylene vinyl acetate, polyvinyl butyral, polyurethane, and combinations thereof.

9. The glazing of claim 1 wherein said light guide laminate stack has a thickness that corresponds to the thickness of said interlayer.

10. The glazing of claim 1 wherein said light guide laminate stack further includes a spacing layer between said film and said second transparency sheet, the material of said spacing layer being selected from the group comprising ethylene vinyl acetate, polyurethane and combinations thereof.

11. The glazing of claim 1 wherein the thickness of said film is in the range of 2 mil to 5 mil.

12. The glazing of claim 1 wherein the body of said light source forms a seal with the perimeter edge of said second transparency sheet.

13. A glazing that projects light in a predetermined pattern in response to an illumination signal, said glazing comprising:
- a glazing laminate that includes at least one transparency sheet that defines a perimeter side edge;
- a light guide laminate stack that defines a first surface that faces at least a portion of said at least one transparency sheet, said transparency sheet having a perimeter side edge of that defines a perimeter, said light guide laminate stack including
  - a film that defines a first film surface, a second film surface that is oppositely disposed on said film from said first film surface, and a film edge between said first film surface and said second film surface with said film edge located outside the perimeter defined by said perimeter side edge, portions of said first film surface and portions of said second film surface each defining a smooth, continuous surface such that light in the visible light spectrum propagates through said film between said smooth, continuous portions of said first film surface and said second film surface, said first film surface also defining a pattern of irregularities in said smooth continuous surface such that light propagating through said film between said first film surface and said second film surface passes out of said first film surface through said pattern of irregularities in said first film surface; and
- a light source that defines a body that contacts the perimeter side edge of said at least one transparency sheet; said light source being connected to said film edge of said film of said light guide laminate stack such that light in the visible spectrum propagates from said light source through said film edge and into said film between said first film surface and said second film surface.

14. The glazing of claim 13 wherein said light source has a thickness of less than 3 mm.

15. A glazing that projects light in a predetermined pattern in response to an illumination signal, said glazing comprising:
- a glazing laminate that includes at least one transparency sheet that defines a perimeter side edge;
- a light guide laminate stack that defines a first surface that faces at least a portion of said at least one transparency sheet, said light guide laminate stack including
  - a film that defines a first film surface, a second film surface that is oppositely disposed on said film from said first film surface, and a film edge between said first film surface and said second film surface, portions of said first film surface and portions of said second film surface each defining a smooth, continuous surface such that light in the visible light spectrum propagates through said film between said smooth, continuous portions of said first film surface and said second film surface, said first film surface also defining a pattern of irregularities in said smooth continuous surface such that light propagating through said film between said first film surface and said second film surface passes out of said first film surface through said pattern of irregularities in said first film surface; and
- a light source that defines a body that contacts the perimeter side edge of said at least one transparency sheet.

16. The glazing of claim 15 wherein said at least one transparency sheet is attached to said light source with said film edge being located inside the perimeter defined by the perimeter side edge of said at least one transparency sheet.

17. The glazing of claim 16 wherein said light source is connected to said film edge of said film of said light guide laminate stack such that light in the visible spectrum propagates from said light source through said film edge and into said film between said first film surface and said second film surface.

18. The glazing of claim 17 wherein said light source includes a light emitting diode.

19. The glazing of claim 16 wherein said film of said light guide laminate stack comprises polycarbonate.

20. The glazing of claim 19 wherein said light guide laminate stack further includes at least one layer of polyethylene terephthalate between said film and said at least one transparency sheet.

21. The glazing of claim 19 wherein said light guide laminate stack further includes at least one spacing layer between said film and said at least one transparency sheet, the material of said spacing layer selected from the group comprising polyvinyl butyral, ethylene vinyl acetate, polyurethane, and combinations thereof.

22. The glazing of claim 20 wherein said light guide laminate stack further includes at least one spacing layer between said layer of polyethylene terephthalate and said at least one transparency sheet, the material of said spacing layer being selected from the group comprising ethylene vinyl acetate, polyvinyl butyral, polyurethane, and combinations thereof.

23. The glazing of claim 15 wherein said film edge is located outside the perimeter defined by the perimeter side edge of said at least one transparency sheet.

24. The glazing of claim 23 further comprising a light source that is connected to said film edge of said film of said light guide laminate stack such that light in the visible spectrum propagates from said light source through said film edge and into said film between said first film surface and said second film surface.

25. The glazing of claim 15 wherein said light source has a thickness of less than 3 mm.

26. The glazing of claim 15 wherein said glazing laminate further includes:
- a second transparency sheet that defines a surface that faces said at least one transparency sheet; and
- an interlayer that is located between said second transparency sheet and said at least one transparency sheet, said interlayer defining a first surface that opposes a surface of said at least one transparency sheet, said interlayer also defining a second surface that opposed to the surface of said second transparency sheet that faces said at least one transparency sheet, the separation between the first surface of said interlayer and the second surface of said interlayer defining the thickness of said interlayer.

27. The glazing of claim 26 wherein said light guide laminate stack has a thickness that corresponds to the thickness of said interlayer.

28. The glazing of claim 26 wherein said film of said light guide laminate stack comprises polycarbonate.

29. The glazing of claim 28 wherein said light guide laminate stack includes at least one layer of polyethylene terephthalate between said film and said second transparency sheet.

30. The glazing of claim 29 wherein said light guide laminate stack further includes a spacing layer between said layer of polyethylene terephthalate and said second transparency sheet, the material of said spacing layer being selected from the group comprising polyvinyl butyral, polyurethane, and ethylene vinyl acetate and combinations thereof.

31. The glazing of claim 28 wherein said light guide laminate stack further includes a spacing layer between said film and said second transparency sheet, the material of said spacing layer being selected from the group comprising ethylene vinyl acetate, polyurethane and combinations thereof.

32. The glazing of claim 30 wherein said film edge of said film extends past the perimeter edge of said second transparency sheet to form an extension tab outside the perimeter of said second transparency sheet with said film edge of said film defining the distal end of said extension tab.

33. The glazing of claim 32 further comprising a light source that is connected to said film edge of said film of said light guide laminate stack such that light in the visible spectrum propagates from said light source through said film edge and into said film between said first film surface and said second film surface.

34. The glazing of claim 32 wherein the thickness of said film is in the range of 2 mil to 5 mil.

35. The glazing of claim 15 wherein the body of said light source forms a seal with the perimeter edge of said second transparency sheet.

36. A glazing that projects light in a predetermined pattern in response to an illumination signal, said glazing comprising:
   a glazing laminate that includes at least one transparency sheet that defines a perimeter side edge;
   a light guide laminate stack that defines a first surface that faces at least a portion of said at least one transparency sheet, said light guide laminate stack including
      a film that defines a first film surface, a second film surface that is oppositely disposed on said film from said first film surface, and a film edge between said first film surface and said second film surface, portions of said first film surface and portions of said second film surface each defining a smooth, continuous surface such that light in the visible light spectrum propagates through said film between said smooth, continuous portions of said first film surface and said second film surface, said first film surface also defining a pattern of irregularities in said smooth continuous surface such that light propagating through said film between said first film surface and said second film surface passes out of said first film surface through said pattern of irregularities in said first film surface;
   said light guide laminate stack defining a perimeter edge that is located inside a perimeter defined by the perimeter side edge of said at least one transparency sheet.

37. The glazing of claim 36 further comprising a light source that is connected to said film edge of said film of said light guide laminate stack such that light in the visible spectrum propagates from said light source through said film edge and into said film between said first film surface and said second film surface.

38. The glazing of claim 37 wherein said light source includes a light emitting diode.

39. The glazing of claim 36 wherein said film of said light guide laminate stack comprises polycarbonate.

40. The glazing of claim 39 wherein said light guide laminate stack further includes at least one layer of polyethylene terephthalate between said film and said at least one transparency sheet.

41. The glazing of claim 39 wherein said light guide laminate stack further includes at least one spacing layer between said film and said at least one transparency sheet, the material of said spacing layer selected from the group comprising polyvinyl butyral, ethylene vinyl acetate, polyurethane, and combinations thereof.

42. The glazing of claim 40 wherein said light guide laminate stack further includes at least one spacing layer between said layer of polyethylene terephthalate and said at least one transparency sheet, the material of said spacing layer being selected from the group comprising ethylene vinyl acetate, polyvinyl butyral, polyurethane, and combinations thereof.

43. The glazing of claim 36 wherein said film edge is located outside the perimeter defined by the perimeter side edge of at least one transparency sheet.

44. The Glazing of claim 43 further comprising a light source that is connected to said film edge of said film of said light guide laminate stack such that light in the visible spectrum propagates from said light source through said film edge and into said film between said first film surface and said second film surface.

45. The glazing of claim 44 wherein said light source defines a body that contacts the perimeter side edge of said at least one transparency sheet.

46. The glazing of claim 36 wherein said light source has a thickness of less than 3 mm.

47. The glazing of claim 36 wherein said glazing laminate further includes:
   a second transparency sheet that defines a surface that faces said at least one transparency sheet; and
   an interlayer that is located between said second transparency sheet and said at least one transparency sheet, said interlayer defining a first surface that opposes a surface of said at least one transparency sheet, said interlayer also defining a second surface that is opposed to the surface of said second transparency sheet that faces said at least one transparency sheet, the separation between the first surface of said interlayer and the second surface of said interlayer defining the thickness of said interlayer.

48. The glazing of claim 36 wherein said light guide laminate stack has a thickness that corresponds to the thickness of said interlayer.

49. The glazing of claim 47 wherein said film of said light guide laminate stack comprises polycarbonate.

50. The glazing of claim 49 wherein said light guide laminate stack includes at least one layer of polyethylene terephthalate between said film and said second transparency sheet.

51. The glazing of claim 50 wherein said light guide laminate stack further includes a spacing layer between said layer of polyethylene terephthalate and said second transparency sheet, the material of said spacing layer being selected from the group comprising polyvinyl butyral, polyurethane, and ethylene vinyl acetate and combinations thereof.

52. The glazing of claim 36 wherein said light guide laminate stack further includes a spacing layer between said film and said second transparency sheet, the material of said spacing layer being selected from the group comprising ethylene vinyl acetate, polyurethane and combinations thereof.

53. The glazing of claim 51 wherein said film edge of said film extends past the perimeter edge of said second transparency sheet to form an extension tab outside the perimeter of said second transparency sheet with said film edge of said film defining the distal end of said extension tab.

54. The Glazing of claim 53 further comprising a light source that is connected to said film edge of said film of said light guide laminate stack such that light in the visible spectrum propagates from said light source through said film edge and into said film between said first film surface and said second film surface.

55. The glazing of claim 36 wherein the thickness of said film is in the range of 2 mil to 5 mil.

56. The glazing of claim 54 wherein said light source defines a body that contacts the perimeter edge of said second transparency sheet.

57. The glazing of claim 36 wherein the body of said light source forms a seal with the perimeter edge of said second transparency sheet.

\* \* \* \* \*